United States Patent
Liepmann

(10) Patent No.: US 12,278,455 B2
(45) Date of Patent: Apr. 15, 2025

(54) APPARATUS AND METHOD FOR REDUCING THERMAL BLOOMING IN AN OPTICAL SUBSYSTEM OF A HIGH ENERGY LASER

(71) Applicant: Northrop Grumman Systems Corporation, Falls Church, VA (US)

(72) Inventor: Till W. Liepmann, La Canada, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1029 days.

(21) Appl. No.: 17/237,600

(22) Filed: Apr. 22, 2021

(65) Prior Publication Data

US 2022/0344889 A1 Oct. 27, 2022

(51) Int. Cl.
*H01S 3/00* (2006.01)

(52) U.S. Cl.
CPC .................................. *H01S 3/005* (2013.01)

(58) Field of Classification Search
None
See application file for complete search history.

(56) References Cited

U.S. PATENT DOCUMENTS

| 5,811,753 A | 9/1998 | Weick et al. |
| 8,929,419 B1 * | 1/2015 | Dean .................... H01S 3/036 372/59 |
| 2004/0187697 A1 | 9/2004 | Orr et al. |

FOREIGN PATENT DOCUMENTS

EP    1 143 491    10/2001

OTHER PUBLICATIONS

International Search Report in related Application Serial No. PCT/US2022/022483, issued on Jul. 20, 2022, 15 pages.
(Continued)

*Primary Examiner* — Jelitza M Perez
(74) *Attorney, Agent, or Firm* — Klintworth & Rozenblat IP LLP

(57) ABSTRACT

An apparatus for reducing thermal blooming in an optical subsystem of a high energy laser (HEL) comprises a fluid pump that receives a first fluid containing diatomic oxygen at a first concentration and a combustion chamber that combusts the first fluid to develop a second fluid containing diatomic oxygen at a second concentration, wherein the second concentration is less than the first concentration, and wherein the second fluid is supplied to the optical subsystem of the HEL A method of operating an HEL having an optical subsystem is also disclosed.

15 Claims, 2 Drawing Sheets

(56) References Cited

OTHER PUBLICATIONS

Fuhs, Allen, E, "Overview of Aero-Optical Phenomena", Proceedings of SPIE, IEEE, US,, vol. 293, Wavefront Distortions in Power Optics, Dec. 30, 1981, pp. 36-55.

Yu Huahua et al: "Thermal blooming effects of gas on laser propagation in a closed tube", Proceedings of SPIE, IEEE, US, vol. 9255, Feb. 3, 2015, pp. 92552Z-92552Z.

What is Catalytic Combustion and Why Only Fuel Catalysts Produce It, Feb. 27, 2018, Rentar Environmental Solutions, Inc., 10 pages, [retrieved on Apr. 22, 2021]. Retrieved from Internet: https://rentar.com/catalytic-combustion/#:~:text=Catalytic%20combustion%20is%20the%20result,a%20spark%20or%20compression%20combustion.&text=Combustion%20units%20such%20as%20these,ignition%20fuel%20catalyst%20is%20required.

Beam Path Purge, Beam Path Conditioning for High-Power Laser Systems, Haas Laser Technologies, 2 pages, [retrieved on Apr. 22, 2021]. Retrieved from Internet: https://www.haaslti.com/pdf/laser-beam-path-purge.pdf.

Burning Oxygen—how much oxygen is required to sustain a flame, Pico Technology, 2 pages, [retrieved on Apr. 22, 2021]. Retrieved from Internet: https://www.picotech.com/library/experiment/burning-oxygen.

\* cited by examiner

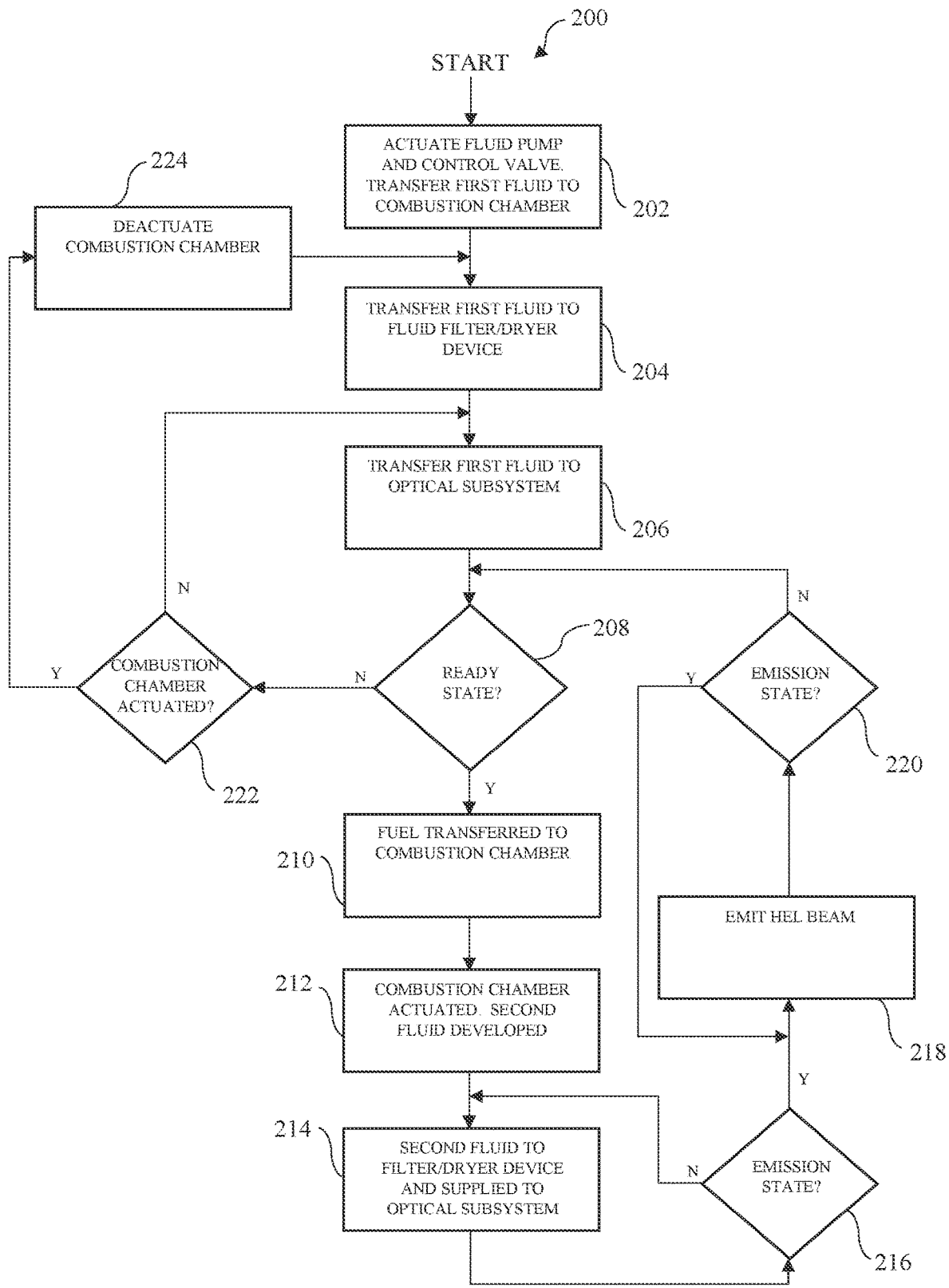

APPARATUS AND METHOD FOR REDUCING THERMAL BLOOMING IN AN OPTICAL SUBSYSTEM OF A HIGH ENERGY LASER

BACKGROUND OF THE DISCLOSURE

1. Field of the Disclosure

The present subject matter relates generally to a high energy laser (HEL), and more particularly, to an apparatus and method for reducing thermal blooming in an optical subsystem of an HEL

2. Description of the Background of the Disclosure

Whether in the air, on land, or at sea, HEL's provide the ability to engage objects at a distance with precision. The effectiveness of a HEL in operation largely depends upon the HEL beam quality developed in an optical subsystem of the HEL Generally, prior to implementation of a "ready" state of the HEL, clean dry air (CDA) is introduced into the optical subsystem. The purging of the optical subsystem with CDA maintains a positive pressure within the optical subsystem to reduce or prevent the introduction of contaminants therein. However, while feasible, CDA is generally not used as the purging agent during emission of the HEL because CDA includes diatomic oxygen in amounts that result in a phenomenon known as "thermal blooming." This phenomenon results from the absorption of HEL energy by diatomic oxygen creating heat and an undesired distortion of the laser beam. One way to minimize/prevent thermal blooming is to use nitrogen in place of at least some of the diatomic oxygen in the gas introduced into the optical subsystem just before and during laser emission, so that the concentration of diatomic oxygen is reduced and replaced by the nitrogen. While effective, the use of nitrogen involves other issues. First, nitrogen must be stored in a container and transported with the HEL. Generally, the nitrogen container is carried by a vehicle or on or adjacent to a platform on which the HEL is installed and must be refilled at depot filling stations, which may be problematic in the case of distant or remote operations. Current nitrogen containers may limit operational use of the HEL to approximately three days. Once the nitrogen is expelled from the container, the HEL can only operate at reduced effectiveness at best until the container is replenished. Furthermore, a high-pressure nitrogen container may deteriorate over time and may unexpectedly release its contents, creating a projectile that may injure personnel. Still further, even a slow leak from a high-pressure nitrogen container can create the potential for operator asphyxiation.

As an alternative to nitrogen, oxygen depleted gas can be used in place of the nitrogen as the purging fluid. Oxygen depleted gas can be generated using a number of chemical or molecular separation systems but are currently disadvantageous in mobile applications because the systems must be oriented with respect to gravity in order to perform properly. Additionally, the chemical or molecular separation systems are typically large and heavy and require considerable electrical power to operate.

SUMMARY

According to one aspect, an apparatus for reducing thermal blooming in an optical subsystem of an HEL comprises a fluid pump that receives a first fluid containing diatomic oxygen at a first concentration, and a combustion chamber that combusts the first fluid to develop a second fluid containing diatomic oxygen at a second concentration, wherein the second concentration is less than the first concentration, and wherein the second fluid is supplied to the optical subsystem of the HEL According to another aspect a method of operating an HEL having an optical subsystem comprises the steps of providing a first fluid containing diatomic oxygen at a first concentration to a combustion chamber, combusting the first fluid in the combustion chamber to develop a second fluid containing diatomic oxygen at a second concentration less than the first concentration, and supplying the second fluid to the optical subsystem of the HEL Other aspects and advantages will become apparent upon consideration of the following detailed description and the attached drawings wherein like numerals designate like structures throughout the specification.

BRIEF DESCRIPTION OF THE DRAWINGS

FIG. 2 is a flowchart of programming executed by the control system of FIG. 1 to implement an exemplary method according to an embodiment.

DETAILED DESCRIPTION

Figure 1:
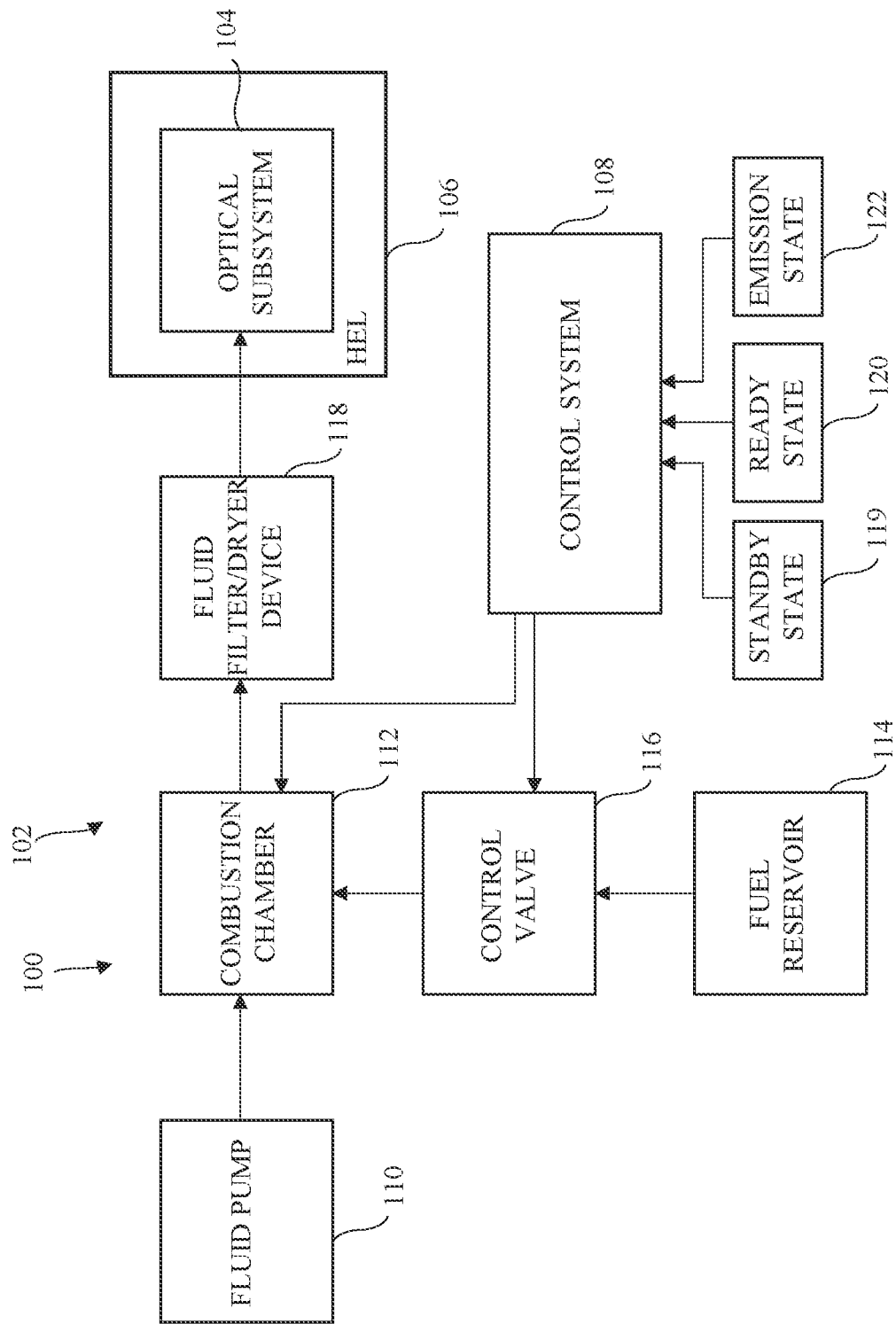
FIG. 1 is a block diagram of an exemplary system comprising an oxygen depletion apparatus and an optical subsystem of a HEL.

Referring to FIG. 1, a fluid supply system 100 includes an oxygen depletion apparatus 102 that provides an oxygen depleted fluid to an optical subsystem 104 of an HEL 106. More particularly, the oxygen depletion apparatus 102 includes a control system 108, a fluid pump 110, and a combustion chamber 112, which is preferably a catalytic combustion chamber. The system 102 further comprises a fuel reservoir 114, a control valve 116, and a fluid filter/dryer device 118, preferably comprising at least one filter device and at least one dryer device. Additional conduits, valves, filter/drying devices, and other instrumentation (not shown) may be used in the system 100.

As illustrated in FIG. 1, the control system 108 of the oxygen depletion apparatus 102 is coupled to the fluid pump 110, the combustion chamber 112, the control valve 116, and the HEL 106. The combustion chamber 112 is also coupled to the fluid pump 110, an outlet port of the control valve 116, and the fluid filter/dryer device 118. The control valve 116 further includes an inlet port coupled to a fuel reservoir 114, wherein fuel may be controllably transferred from the fuel reservoir 114 to the combustion chamber 112 through the control valve 116. Still further, the fluid filter/dryer device 118 is coupled to the optical subsystem 104 of the HEL 106. Advantageously, the oxygen depletion apparatus 102 is relatively insensitive to changes in orientation, shock, vibration, or humidity levels during use.

Upon actuation of the HEL 106, the control system 108 operates the various components in one of standby, ready, and emission states as determined by signals supplied by automatic or user-operated signaling devices 119, 120, and 122. The standby state 119 is implemented as a default state when the HEL 106 is operational but not being prepared for or not in use. The ready state 120 is operational when the HEL 106 is ready for immediate emission. The emission state 122 is operational during emission of a laser beam from the HEL 106.

More particularly, during operation in the standby state, the control system 108 actuates the fluid pump 110 to draw in a first fluid from outside the fluid pump 110 and transfer the first fluid having a first diatomic oxygen concentration to the combustion chamber 112. The combustion chamber is deactuated during operation in the standby state and the first fluid is transferred to the fluid filter/dryer device 118 to clean and dry the first fluid. The clean and dried first fluid is then supplied to the optical subsystem 104 to purge the HEL beam path of contaminants. In an embodiment, the fluid pump 110 is an air pump that draws ambient air. The flow rate of the air pump may be about 0.25 L/min to 1.00 L/min per 1.00 L of purged volume in the HEL 106, more preferably from about 0.50 L/min to 1.00 L/min, and most preferably 1.00 L/min.

During operation in the ready state, the control system 108 actuates the fluid pump 110 to draw in the first fluid from outside the fluid pump 110 and transfer the first fluid to the combustion chamber 112. The flow rate of the fluid pump may be about 0.25 L/min to 1.00 L/min per 1.00 L of purged volume in the HEL 106, more preferably from about 0.50 L/min to 1.00 L/min, and most preferably 1.00 L/min. Furthermore, the control system actuates the combustion chamber 112 so as to combust the first fluid within the combustion chamber 112. In an embodiment, the combustion chamber size is about 5% of the HEL purge volume. The first fluid provided to the combustion chamber 112 comprises a first concentration of diatomic oxygen. In an embodiment, the first concentration of diatomic oxygen in the first fluid is from about 19.5% to 23.5%, preferably about 21%. Additionally, the control system 108 actuates the control valve 116 to an open position wherein fuel located within the fuel reservoir 114 is transferred from the fuel reservoir 114 through the control valve 116 to the combustion chamber 112. In an embodiment, the flow rate through the control valve 116 is from about $6.25 \times 10^{-5}$ L/min to $2.50 \times 10^{-4}$ L/min per 1.00 L of purged volume in the HEL 106, more preferably from about $1.25 \times 10^{-4}$ L/min to $2.50 \times 10^{-4}$ L/min, and most preferably $2.50 \times 10^{-4}$ L/min. Combustion of the first fluid in the combustion chamber 112 rapidly develops an oxygen depleted second fluid comprising a second concentration of diatomic oxygen wherein the concentration of diatomic oxygen in the second fluid is less than the concentration of diatomic oxygen in the first fluid. In an embodiment, the second fluid may contain between about 0% and about 67% less diatomic oxygen, and more preferably between about 33% and 67% less diatomic oxygen. The second fluid is transferred to and engages the fluid filter/dryer device 118, which reduces combustion byproducts such as carbon monoxide, carbon dioxide, water vapor, and unburned fuel that may be contained in the second fluid and that may distort the HEL beam. In one embodiment, the fluid filter/dryer device 118 may remove contaminants exceeding 20 microns and reduce dew points from about 100° C. to about minus 40° C., and most preferably about minus 40° C. Upon exiting the fluid filter/dryer device 118, the second fluid is supplied to the optical subsystem 104 to purge the HEL beam path of the optical subsystem 104.

Upon purging the beam path of the optical subsystem 104 with the second fluid, the control system 108 may operate the HEL 106 in the emission state to emit a laser beam through the optical subsystem 104. In an embodiment, the HEL beam may be from about 1 cm to about 10 cm in diameter and produce a peak power from about 10,000 W to about 1,000,000 W. The second fluid within the beam path having a lower diatomic oxygen concentration reduces the amount of HEL beam distortion by diatomic oxygen resulting in less thermal blooming within the beam path of the HEL 106 and a high HEL beam quality. The relative reduction in diatomic oxygen is proportional to the relative reduction in thermal blooming during emission of the HEL beam from the HEL 106. For example, the relative reduction in thermal blooming is equal to $1-(SF_O/FF_O)^2$, wherein $SF_O$ is the diatomic oxygen concentration of the second fluid, and $FF_O$ is the diatomic oxygen concentration of the first fluid. In one embodiment wherein the first fluid contains about 21% diatomic oxygen and the second fluid contains about 14% diatomic oxygen, the relative reduction in thermal blooming is about 56%.

In one embodiment, the relative reduction in thermal blooming may be further enhanced wherein the combustion chamber 112 is a catalytic combustion chamber. In general, a catalytic combustion system incorporates metals, such as platinum, to reduce hydrocarbon emission such as carbon monoxide and unburned fuel. The combustion within the catalytic combustion chamber 112 develops and heats the second fluid but in a flameless environment. In one embodiment, the catalytic combustion chamber 112 develops a second fluid with a second diatomic oxygen concentration and heat. In another embodiment, propane is stored in the fuel reservoir 114, and is used as the fuel in the combustion process within the catalytic combustion chamber. In this embodiment, the diatomic oxygen concentration of the second fluid is reduced to about 8.8% reducing thermal blooming by about 82%. In general, the oxygen depletion apparatus 102 reduces thermal blooming from about 10% to about 82%, and most preferably about 82%.

In one embodiment, the combustion process is undertaken only during operation in the ready state and the emission state so as to minimize fuel consumption for greater operational availability. As described above, any combustible gas or liquid fuel may be stored in the fuel reservoir 114. In one embodiment, the fuel is jet fuel, liquid gasoline or diesel fuel. In another embodiment, the fuel is any gaseous or liquid hydrocarbon, such as methane, or propane. In cases where the HEL 106 is installed on a powered vehicle, the fuel may be the same that is used for vehicle propulsion, so that there is no need for a dedicated fuel source and associated equipment.

In another embodiment, upon exhaustion of fuel within the fuel reservoir 114, the system 102 may continue to emit an HEL beam using the clean and dry first fluid as the purging fluid, but at a performance reduction until the fuel reservoir 114 can be replenished. As should be evident from the foregoing, the performance reduction is directly related to the amount of diatomic oxygen present in the purging fluid.

Generally, the oxygen depletion apparatus 102 may develop the oxygen depleted second fluid having a second diatomic oxygen concentration in a temperature range from about minus 40° C. to about 71° C. Furthermore, the system 102 may develop the second fluid under any atmospheric or ambient pressure.

Also, it should be apparent to those who have skill in the art that any combination of hardware and/or software may be used to implement any or all of the system or components thereof described herein. It will be understood and appreciated that one or more of the processes, sub-processes, and process steps described in connection with the FIGS. may be performed by hardware, software, or a combination of hardware and software on one or more electronic or digitally controlled devices. The software may reside in a software memory (not shown) in a suitable electronic processing component or system such as, for example, the control system 108. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within the control system 108 that may include, for example, one or more microprocessors, general purpose processors, combinations of processors, digital signal processors (DSPs), field programmable gate arrays (FPGAs), or application-specific integrated circuits (ASICs). The embodiments described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer disk or diskette (magnetic); a random access, i.e., volatile, memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical).

It will also be understood that receiving and transmitting of signals or data as used in this document means that two or more systems or components are capable of communicating with each other via signals that travel over some type of signal path. The signals may be communication, power, data, or energy signals, which may communicate information, power, or energy from a first system or component to a second system or component along a signal path between the first and second system or component. The signal paths may include physical, electrical, magnetic, electromagnetic, electrochemical, optical, wired, or wireless connections. The signal paths may also include additional systems or components between the first and second system or component.

FIG. 2 illustrates the operation of the system 100. At step 200, the system 100 starts up in a selected operational state. In one embodiment, the system 100 is placed in an operational state when a mobile or stationary apparatus is engaged. For example, if the HEL 106 and the system 100 are carried by a mobile land use vehicle, the system 100 may be placed in an operational state upon engagement of the vehicle engine. In another embodiment, the system 100 is placed in an operational state upon engagement of a switch, button, or other control wherein the operator of the HEL 106 may place the system 100 in an operational state independent of the mobile or stationary apparatus. In an embodiment, the selected operational state may be the default standby state 119.

At step 202, the control system 108 actuates the fluid pump 110 and the control valve 116, wherein the fluid pump 110 draws in the first fluid in the form of ambient air from outside the fluid pump 110 and transfers the first fluid having the first diatomic oxygen concentration to the deactuated combustion chamber 112.

At step 204, the first fluid is transferred from the deactuated combustion chamber 112 to the fluid filter/dryer device 118 wherein the first fluid is cleaned and dried. Upon completion of the cleaning and drying of the first fluid, the first fluid is supplied at step 206 to the optical subsystem 104 to purge the HEL beam path of contaminants. Although not shown, the step 206 may be continuously undertaken for a selected period of time before undertaking subsequent steps to ensure that effective purging has been accomplished.

At step 208 the control system 108 detects the commanded state of the HEL 106. If the HEL 106 is not being commanded to undertake the ready state and the combustion chamber 112 is not actuated (step 222), clean and dried first fluid is supplied to the optical subsystem 104 of the HEL 106. If the control system 108 detects that the HEL 106 is being commanded to operate in the ready state, the control system 108 commands the control valve 116 to an open position so that fuel from the fuel reservoir 114 is transferred through the control valve 116 to the combustion chamber 112 and the combustion chamber 112 is actuated by the control system 108 (steps 210 and 212). The first fluid having the first concentration of diatomic oxygen drawn from the fluid pump 110 is combusted in the combustion chamber 112 to develop the second fluid having the second diatomic oxygen concentration wherein the second concentration is less than the first concentration of the first fluid.

At step 214, the second fluid is cleaned and dried by the fluid filter/dryer device 118 and is transferred to the optical subsystem 104 to purge the HEL beam path of the optical subsystem 104.

At step 216, the control system 108 detects whether the emission state is commanded. If this is not the case, the second fluid continues to purge the optical subsystem 104 of the HEL 106 of contaminants. If the emission state is commanded, at step 218 the HEL beam is emitted through the purged beam path of the optical subsystem 104 containing the second fluid.

At step 220, the control system 108 detects whether the emission state is still being commanded. If this is the case, the HEL beam continues to be emitted through the optical subsystem 104 of the HEL 106. If the emission state is no longer commanded, the control system 108 reverts to the step 208. If the HEL 106 is being commanded to undertake the ready state, the control system 108 again proceeds to the step 210. If the HEL 106 is not being commanded to undertake the ready state and the control system 108 determines that the combustion chamber 112 is actuated (step 222), the combustion chamber 112 is deactuated (step 224) and the first fluid having the first diatomic oxygen concentration is transferred from the deactuated combustion chamber 112 to the fluid filter/dryer device 118 wherein the first fluid is cleaned and dried. Upon completion of the cleaning and drying of the first fluid, the first fluid is supplied at step 206 to the optical subsystem 104 to purge the HEL beam path of contaminants.

INDUSTRIAL APPLICABILITY

In summary, the oxygen depletion apparatus 102 creates a diatomic oxygen depleted second fluid via controlled combustion of a first fluid to reduce thermal blooming inside the beam path of an HEL 106. The rapid, light weight, and robust combustion to develop the second fluid from the first fluid may be undertaken over a wide range of temperatures, pressures, and flow rates, thus providing the ability to retrofit an existing HEL regardless of orientation, and provides a system not sensitive to shock, vibration, or humidity levels during use.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only and should not be taken as limiting the scope of the disclosure.

I claim:

1. An apparatus for reducing thermal blooming in an optical subsystem of a high energy laser (HEL), comprising:
    a fluid pump that receives a first fluid containing diatomic oxygen at a first concentration; and
    a combustion chamber that combusts the first fluid to develop a second fluid containing diatomic oxygen at a second concentration, wherein the second concentration is less than the first concentration, and wherein the second fluid is supplied to the optical subsystem of the HEL.

2. The apparatus of claim 1, further comprising a fluid filter/dryer device in fluid communication between the combustion chamber and the optical subsystem.

3. The apparatus of claim 2, wherein the fluid filter/dryer device comprises at least one of a filter device and at least one dryer device wherein the second fluid engages the at least one of a filter device and at least one dryer device.

4. The apparatus of claim 1, wherein the first fluid is air.

5. The apparatus of claim 1, wherein the fluid pump is an air pump.

6. The apparatus of claim 1, wherein the combustion chamber is a catalytic combustion chamber.

7. The apparatus of claim 1, further comprising a fuel reservoir and a control valve wherein the control valve is coupled to the combustion chamber and the fuel reservoir.

8. The apparatus of claim 7, further comprising a fuel within the fuel reservoir.

9. The apparatus of claim 8, wherein the fuel is any gaseous or liquid hydrocarbon.

10. The apparatus of claim 1, wherein the apparatus is insensitive to orientation.

11. A method of operating a high energy laser (HEL) having an optical subsystem, the method comprising the steps of:
    providing a first fluid containing diatomic oxygen at a first concentration to a combustion chamber;
    combusting the first fluid in the combustion chamber to develop a second fluid containing diatomic oxygen at a second concentration less than the first concentration; and
    supplying the second fluid to the optical subsystem of the HEL.

12. The method of claim 11, further comprising the step of transferring the second fluid to a fluid filter/dryer device in fluid communication between the combustion chamber and the optical subsystem.

13. The method of claim 11, wherein the first fluid is air.

14. The method of claim 11, wherein the combustion chamber is a catalytic combustion chamber.

15. The method of claim 11, further comprising the step of engaging a control system in fluid communication with the combustion device, wherein the control system input for the HEL is a ready state.

* * * * *